United States Patent

[11] 3,601,048

| | | | |
|---|---|---|---|
| [72] | Inventor | Hermann Beisel |  |
|  |  | Wiesloch, Germany |  |
| [21] | Appl. No. | 778,657 |  |
| [22] | Filed | Nov. 25, 1968 |  |
| [45] | Patented | Aug. 24, 1971 |  |
| [73] | Assignee | Heidelberger Druckmaschinen |  |
|  |  | Aktiengesellschaft |  |
|  |  | Heidelberg, Germany |  |
| [32] | Priority | Nov. 24, 1967 |  |
| [33] |  | Germany |  |
| [31] |  | 64 559 |  |

[54] DEVICE FOR MOUNTING FRICTION CYLINDERS IN INKING AND MOISTENING APPARATUS OF PRINTING MACHINES
5 Claims, 4 Drawing Figs.

[52] U.S. Cl. ..................................... 101/348,
29/115, 64/5, 82/43, 160/326
[51] Int. Cl. ....................................... F16c 35/08
[50] Field of Search.......................................... 101/348,
349, 148, 174, 212, 216, 205, 314, 320, 321; 64/4,
5; 29/115, 125, 129, 129.5; 160/326; 82/43, 44

[56] References Cited
UNITED STATES PATENTS
| 76,372 | 4/1868 | Allen............................ | 101/216 UX |
| 1,591,452 | 7/1926 | White............................ | 101/352 |
| 2,599,278 | 6/1952 | Osgood.......................... | 101/212 |
| 3,173,360 | 3/1965 | Hamilton....................... | 101/216 X |

FOREIGN PATENTS
| 250,388 | 6/1948 | Switzerland.................. | 101/216 |

*Primary Examiner*—Robert E. Pulfrey
*Assistant Examiner*—C. Coughenour
*Attorneys*—Curt M. Avery, Arthur E. Wilfond, Herbert L. Lerner and Daniel J. Tick ABSTRACT: Device for removably mounting a hollow friction cylinder in inking and moistening apparatus of a printing machine includes clamping means comprising a clamping screw and nut threaded thereon located within the friction cylinder, respectively at opposite ends thereof, and being mutually threadingly rotatable for varying the length of the clamping means, bearing pins for the friction cylinder having a receiving shell wherein respective end portions of the screw and nut are received form lockingly in axial direction and removably in radial direction thereof, each bearing pin having a flange substantially conforming to a guide bore formed in the friction cylinder, the clamping means being actuable externally to the friction cylinder to force the flanges into the respective guide bores.

Patented Aug. 24, 1971 3,601,048
2 Sheets-Sheet 1
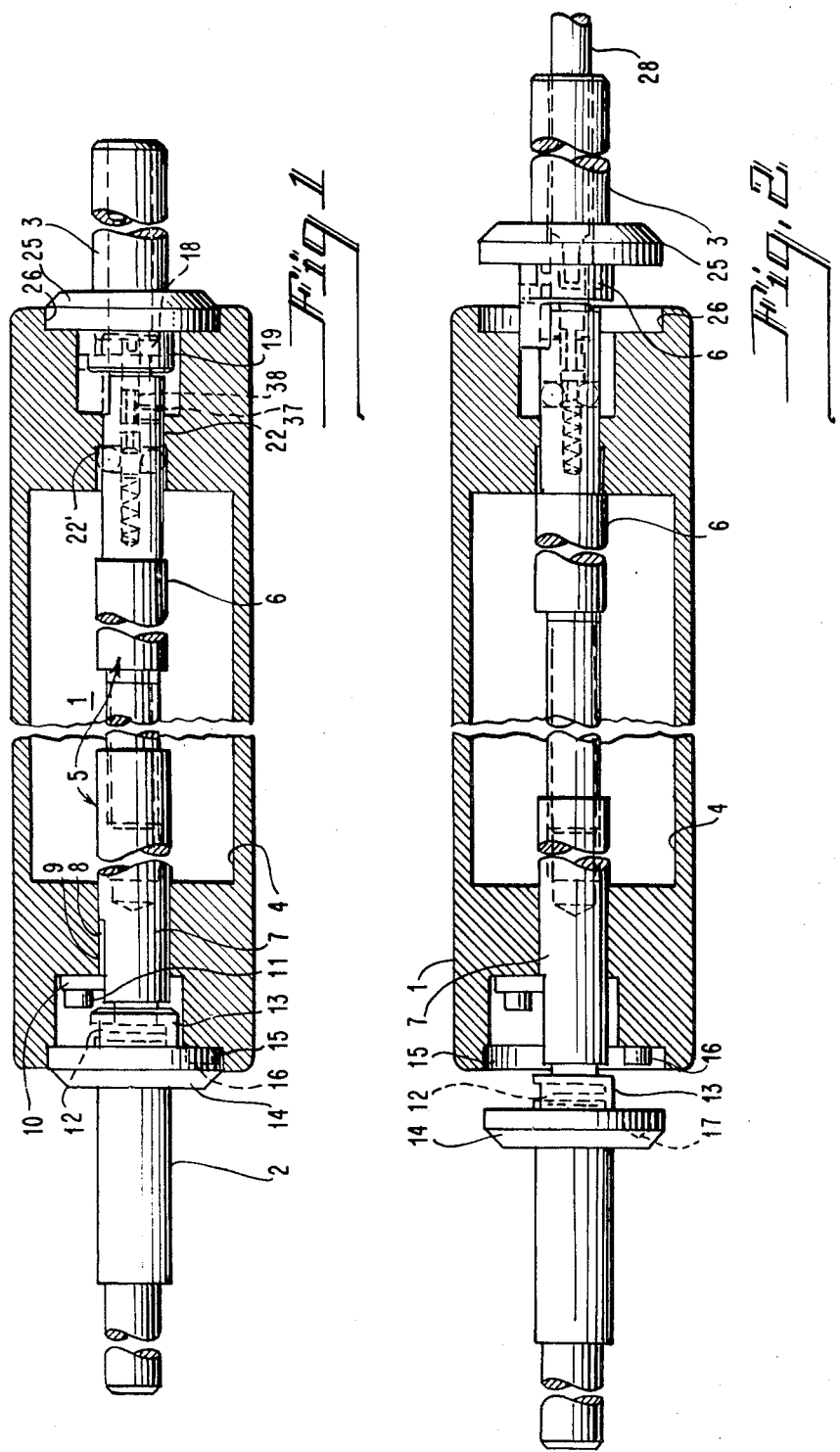

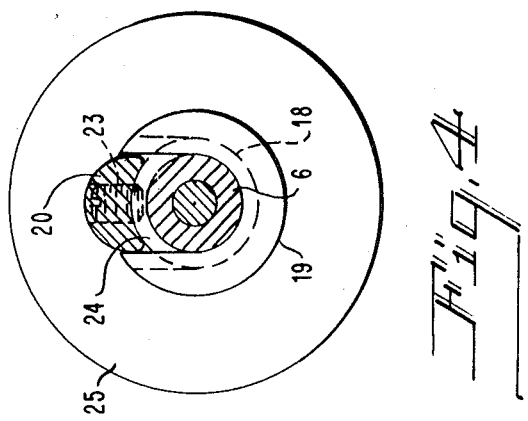
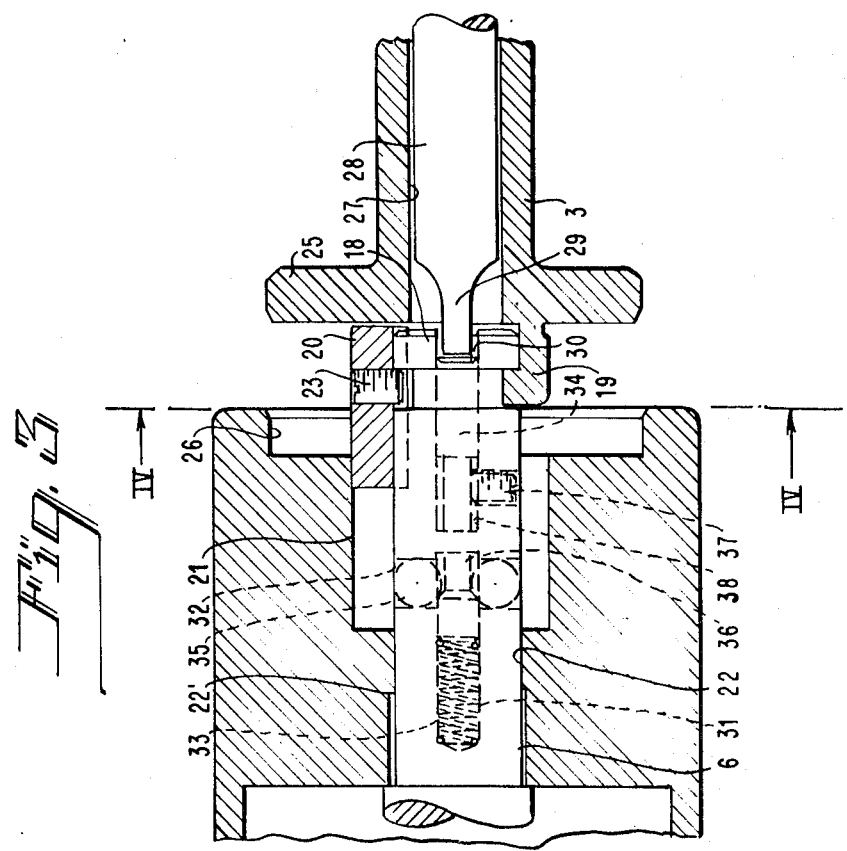

DEVICE FOR MOUNTING FRICTION CYLINDERS IN INKING AND MOISTENING APPARATUS OF PRINTING MACHINES

My invention relates to device for mounting friction cylinders in inking and moistening apparatus of printing machines and more particularly, to such device wherein the friction cylinder bearing pins are disengageable from the friction cylinder by axial displacement thereof into bearing bushings located in sidewalls of the printing machine in order to remove the friction cylinder from the printing machine.

As is well known, the wiper rollers of a moistening apparatus must be cleaned. In order to gain access to these rollers that are to be cleaned, it is necessary to mount the friction cylinder so that it is capable of being swung out of the way or entirely removable. Also, due to space limitations in inking apparatus, removal of the friction cylinder is often imperative in order to be able to exchange the inking roller.

Several demands must be met by the means for coupling such a removable friction cylinder, namely:
 a. it must be capable of being released rapidly and simply, if possible on one side of the printing machine.
 b. it must be space saving so that adequate space remains for the change travel of the friction cylinder.
 c. it must be protected against soiling.
 d. the centering of the friction cylinder by the bearing pins must ensure trouble-free concentric rotation thereof.
 e. the coupling means must be of such construction that it will not loosen of itself during operation, for example due to increase of the friction at the friction cylinder.

Disengageable means for mounting a removable friction cylinder known from German Pat. No. 1,219,950, fulfills some of the aforementioned requirements or demands. This known mounting means is formed of two conical bearing pins on which the friction cylinder is suspended. One of the bearing pins is axially displaceable in a sidewall of the printing machine and is forced into a conical bearing bushing of the friction cylinder by a helical spring. This helical spring must be of such strength as to effect the change return travel without releasing the conical bearing pins from the bearing bores of the friction cylinder.

However, the frictional force at the friction cylinder can increase to an unforeseen extent due to the use of viscous ink or due to increase in the pressure exerted thereon so that the compression spring is unable to overcome this resistance. As a consequence thereof, the friction cylinder falls out of the disengageable mounting means therefor. A further disadvantage of the aforementioned known device is the vulnerability of the couplable bearing to soiling. Even if the conical bearing pins are soiled only slightly, one can, nevertheless, no longer expect concentric rotation of the friction cylinders.

It is accordingly an object of my invention to provide device for mounting friction cylinders in inking and moistening apparatus of printing machines that avoids the aforementioned disadvantages of the heretofore known devices of this general type, and which moreover meets all of the demands therefor listed hereinabove under the items (a) to (e).

With the foregoing and other objects in view, I provide in accordance with my invention, device for removably mounting a friction cylinder in inking and moistening apparatus of a printing machine comprising clamping means disposed within the friction cylinder and coaxial thereto, the clamping means including a clamping screw located at one end of the friction cylinder and a clamping nut threaded on the screw and located at the other end of the friction cylinder, the screw and nut being threadedly rotatable relative to one another so as to vary the length of the clamping means, a bearing pin located at each end of the friction cylinder and adapted to be axially displaceably received at an outer end thereof in a respective bearing bushing mounted in a sidewall of the printing machine, the bearing pins having a receiving shell at the inner ends thereof for receiving therein an end portion of the clamping screw and the clamping nut, respectively, whereby the clamping means is suspended in the receiving shells of the bearing pins, the respective end portions of the screw and the nut being form-lockingly secured in the receiving shells in axial direction thereof and being removable therefrom in radial direction thereof, each of the bearing pins having a clamping flange conforming substantially to a guide bore formed in the friction cylinder, the clamping means being actuable from the outside of the friction cylinder to force the clamping flanges into the respective guide bores.

In accordance with a further feature of my invention, one of the two bearing pins is formed with a longitudinal bore for receiving a key therein, the key having a flattened head similar to that of a screwdriver, which is insertable in a matching slot formed in one of the end portions of the clamping means, namely the end portion of the clamping screw.

In accordance with another feature of my invention, I provide a safety device comprising a locking pin slidable between a locking and a disengaged position in a blind bore formed in the bearing pin and extending coaxial therewith, a helical spring disposed in the blind bore and continually biasing the locking pin in direction toward the slotted end portion of the clamping screw a pair of ball members located diametrically opposite one another in a bore formed in the clamping screw transversely to the axis thereof, the ball members being pressed against a shoulder of a bearing bore formed in the friction cylinder in the locking position of the locking pin, the locking pin being slidable against the force of the spring in the blind bore in response to a force applied through the key whose head is received in the matching slot formed in the clamping pin so that an annular groove formed in the locking pin is radially aligned with the ball members whereby the ball members drop into the annular groove, as they are freed from the shoulder of the bearing bore.

Other features which are considered as characteristic for the invention are set forth in the appended claims.

Although the invention is illustrated and described herein as embodied in device for mounting friction cylinders in inking and moistening apparatus of printing machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a longitudinal view, partly in section, of a friction cylinder for an inking apparatus of a printing machine equipped with the mounting means of my invention and showing the bearing pins thereof in engaged condition;

FIG. 2 is a view corresponding to that of FIG. 1 but with the bearing pins disengaged;

FIG. 3 is an enlarged view of the right-hand portion of FIG. 2 which shows the servicing side of the friction cylinder; and FIG. 4 is a cross-sectional view of FIG. 3 taken along the line IV—IV in the direction of the arrows.

Referring now to the drawings, and first particularly to FIGS. 1 and 2 thereof, there is shown a friction cylinder 1 suspended between two bearing pins 2 and 3. It should be assumed that the bearing pin 2 is connectable to the drive mechanism of a printing machine, and that the bearing pin 3 is on the servicing side of the friction cylinder 1.

The friction cylinder 1 is formed with a hollow chamber 4 in which there is mounted a clamping device 5, much like a turnbuckle, which extends coaxially to the cylinder 1. The clamping device 5 is formed of a clamping screw 6 and a clamping nut 7, which is screwed thereon.

The clamping nut 7 is carried in a bearing bore 8 of the friction cylinder 1. A flat surface 9 is provided on the outer peripheral surface of the clamping nut 7, and cooperated with a stop member 10 acting, so to speak, as a safeguard against torsional movement of the nut 7. The stop member 10 is located in an enlargement of the bore 8 and is firmly fastened to the friction cylinder 1 by a screw 11. The bearing end 12 of the clamping nut 7 extends into a receiving shell 13 of the bearing pin 2. The receiving shell 13 is open at the top thereof as viewed in FIGS. 1 and 2, so that the bearing end 12 can be raised out of the receiving shell 13 through the open top thereof.

Besides the receiving shell 13, a clamping flange 14 is provided on the bearing pin 2 and is receivable in a guide bore 15 formed in the friction cylinder 1 adjoining the enlargement of the bore 8. The guide bore 15 has a greater cross section than the enlargement of the bore 8 so that a radial shoulder is defined between the enlarged and narrower portions of the bore 8, an entrainer pin 16 being secured on the surface of the radial shoulder. The clamping flange 14 is formed with a recess 17 in which the entrainer pin 16 is receivable in the engaged condition of the device of my invention as shown in FIG. 1.

The bearing end 18 of the clamping screw 6 is similarly receivable in a receiving shell 19 of the bearing pin 3 located on the servicing end of the friction roller 1. The positioning of the clamping screw 6 in the receiving shell 19 is shown especially clearly in the cross-sectional view of FIG. 4. As can be seen in FIG. 4, the receiving shell 19, similar to the receiving shell 13, is open at the top thereof so that the clamping screw 6 and the bearing end 18 thereof can be lifted out of the shell 19 in the disengaged condition of the device of my invention as shown in FIG. 2, for example.

A guiding jewel 20 is provided above the clamping screw 6 and is located in a groove 21 (FIG. 3) formed in a bearing bore 22 of the cylinder 1. The guiding jewel 20 projects into the opening at the top of the receiving shell 19 and thereby assures accurate radial alignment and coordination of the bearing pin 3 with the friction cylinder 1. A setscrew 23 (FIGS. 3 and 4) extends through the guiding jewel 20 into an entrainer groove 24 formed in the clamping screw 6.

The bearing pin 3 is also provided with a clamping flange 25, similar to the clamping flange 14 of the bearing pin 2, which is similarly receivable in a corresponding guide bore 26 formed in the friction cylinder 1.

The bearing pin 3 is formed with a longitudinal bore 27 in which a key 28 is insertable. The key 28 has a flattened end 29, much like that of a screwdriver, which corresponds in size to a slot or kerf 30 formed in the bearing end 18 of the clamping screw 6. As shown particularly in the enlarged view of FIG. 3, there are formed in the clamping screw 6, a blind bore 31 extending coaxially to the screw 6 and a through bore 32 extending transversely thereto. A compression spring 33 and a locking pin 34 are slidably disposed in the blind bore 31. The transverse bore 32 contains a pair of ball members 35 located diametrically opposite one another and which, in the engaged or locked condition of FIG. 1, abut the peripheral outer surface of the locking pin 34, while in the disengaged or unlocked condition of FIG. 2, are received in an annular groove 36 formed in the peripheral surface of the locking pin 34. By inserting the key 28 into the slot 30, as shown in FIGS. 2 and 3, and applying an axially directed force thereto, the locking pin 34 can be axially displaced more deeply into the blind bore 31, toward the left-hand side of FIG. 1, against the biasing force of the spring 33 so that the ball members 35 slip into the annular groove 36. In the engaged or locked condition of FIG. 1, i.e. in the normal position of the locking pin 34, the ball members 35 abut the outer peripheral surface of the locking pin 34 and project radially beyond the peripheral surface of the clamping screw 6 into a radial enlargement of the bearing bore 22. The balls 35 engage a shoulder 22' defined by the bearing bore 22 and the enlargement thereof when the clamping device 25 is unintentionally loosened.

FIG. 1 shows the clamping device 5 in locked or engaged condition i.e. the clamping flange 14 of the bearing pin 2 and the clamping flange 25 of the bearing pin 3 are tightly inserted in the corresponding guide bores 15 and 26 respectively, that are formed in opposite ends of the friction cylinder 1. In the condition of FIG. 1, the friction cylinder 1 and the bearing pins 2 and 3 form a unitary structure.

In order to remove the friction cylinder 1 from the inking apparatus of a printing machine, the clamping device 5 must be loosened or released. This is effected by inserting the key 28 into the bore 27 so deeply that the flattened screwdriver head 29 of the key 28 is received in the slot 30 of the bearing end 18 of the clamping screw 6. The locking pin 34 is accordingly pushed farther into the blind bore 31 of the friction cylinder 1 against the opposing compressive force of the spring 33 until the balls 35 slip into the annular groove 36 and the balls 35, consequently, cannot any longer abut the shoulders 22' of the enlarged bearing bore 22.

By turning the key 28 in clockwise direction as viewed from the right-hand side of FIG. 3, for example, the clamping device 5 is loosened or released and the length thereof is thereby increased as shown in FIG. 2 when compared to the length thereof as shown in FIG. 1. The clamping flanges 14 and 25 are consequently automatically forced out of the respective guiding bores 15 and 26 therefor until the receiving shells 13 and 19 are withdrawn from the bores at the respective ends of the friction cylinder 1. The bearing ends 12 and 18 of the clamping device 5 are then able to be lifted out of the respective receiving shells 13 and 19 through the respective openings at the top thereof as viewed in FIG. 2, for example. This, of course, means that the friction cylinder 1 is free of its mounting and can then be removed from the inking apparatus of the printing machine.

After the inking rollers of the inking apparatus have been replaced, the friction cylinder 1 can again be suspended between the mounting bearings therefor. The clamping device 5 is then retightened or reengaged by means of the key 28. The clamping flanges 14 and 25 are thereby reinserted in the guide bores 15 and 26, respectively, of the friction cylinder 1. The key 28 is turned counterclockwise as viewed from the right-hand side of FIG. 2, for example, until the clamping flanges 14 and 25 are forced up against the flat shoulders respectively located at the base of the enlargements of the guide bores 15 and 26.

When the axially applied pressure on the key 28 is released and the key 28 is withdrawn from the longitudinal bore 27 of the bearing pin 3, the spring 33 forces the arresting pin 34 in direction toward the bearing pin 3 and therewith forces both balls 35 out of the annular groove 36 against the shoulder 22" at the base of the enlargement of the bearing bore 22.

A radially extending set screw 37 is provided in the clamping screw 6 projecting into an elongated annular groove 38 formed in the arresting pin 34. When the balls 35 are forced out of the annular groove 36 by the pressure of the expanding spring 33, the pin 34 is prevented from sliding out of the blind bore 31 by the abutment of the set screw 37 against a radial shoulder forming a side of the annular groove 38 formed in the pin 34.

Even if the thread of the clamping screw 6 is self-locking to a great degree so that, in practice, no unintentional loosening or release of the clamped bearing pins 2 and 3 from the friction cylinder 1 is anticipated, nevertheless further assurance is provided by the locking pin 34 and the ball members 35 that the friction cylinder 1 will never be able to fall out of the bearings or mountings thereof.

Even if the clamping device 5 should loosen slightly, the ball members 35 abutting the shoulder 22' will nevertheless still prevent the clamping flanges 14 and 25 from slipping out of their respective guide bores 15 and 26. The concentric rotation of the friction cylinder 1 is thus assured even if the clamping device 5 should loosen.

Due to the fact that the clamping device 5 of my invention forces both clamping flanges 14 and 25 of the respective bearing pins 2 and 3 into the respective guide bores 8 and 22 of the friction cylinder 1, the bearing pins and the friction cylinder are thereby united into a single entity. An absolutely accurate concentric rotation of the friction cylinder 1 is thereby assured. Moreover, the coupling of the bearing pins 2 and 3, which are inserted in the most space-saving manner within the friction cylinder 1, cannot be soiled because the clamping flanges 14 and 25 shield the interior of the friction cylinder against the introduction of any dirt or moisture into the same. Furthermore, the thread of the clamping screw 6 and clamping nut 7 can be of such self-locking construction that any spontaneous or involuntary loosening of the clamping device 5 is not to be feared.

By the use of a key such as that of the key 28 of the device of my invention, no handwheel is required such as is found in heretofore known devices of this general type. The use of such a handwheel has the latent danger that the friction cylinder mounting will be decoupled or loosened by inadvertence. A removable key such as that of my invention prevents an undesired actuation of the decouplable friction cylinder mounting. It is particularly advantageous to employ the key 28 in addition to a safety device for the bearing coupling as in the invention of the instant application.

If the clamping device 5 should loosen, contrary to expectation, the clamping flanges 14 and 25 of the respective bearing pins 2 and 3 can nevertheless not slip out of the respective guide bores 15 and 26, because the aforedescribed safety device of my invention prevents further unthreading of the clamping nut 7 and the clamping pin 6. In disadvantageous situations when, for example, the clamping device 5 is not sufficiently tightened, the coupling of the friction cylinder bearings or mountings can, in fact, loosen slightly, however, never to such an extent that one need fear that the friction cylinder will fall out of the bearings or mountings thereof.

I claim:

1. Device for removably mounting a friction cylinder in inking and moistening apparatus of a printing machine comprising clamping means disposed within the friction cylinder and coaxial thereto, said clamping means including a clamping screw and a clamping nut extending into the friction cylinder from opposite ends thereof, said clamping nut being threaded on said screw, said screw and nut being threadedly rotatable relative to one another so as to vary the length of said clamping means, a bearing pin located at each end of the friction cylinder and adapted to be axially displaceably received at an outer end thereof in a respective bearing bushing mounted in a sidewall of the printing machine, said bearing pins having a receiving shell at the inner ends thereof for receiving therein an end portion of said clamping screw and said clamping nut, respectively, said clamping means being thereby suspended in said receiving shells of said bearing pins, the respective end portions of said screw and said nut being form-lockingly secured in said receiving shells in axial direction thereof and being removable therefrom in radial direction thereof, each of said bearing pins having a clamping flange conforming substantially to a guide bore formed in the friction cylinder, said clamping means being actuable from the outside of the friction cylinder to force said clamping flanges into the respective guide bores.

2. Device according to claim 1, wherein one of said two bearing pins is formed with a longitudinal bore for receiving a key therein, said key having a flattened head similar to that of a screwdriver, said flattened head being insertable in a matching slot formed in one of the end portions of said clamping means.

3. Device according to claim 2 wherein the end portion formed with the slot is the end portion of said clamping screw.

4. Device according to claim 3 comprising a safety device including a locking pin slidable between a locking and a disengaged position in a blind bore formed in said clamping screw and extending coaxial therewith, a helical spring disposed in said blind bore and continually biasing said locking pin in direction toward said slotted end portion of said clamping screw, a pair of ball members located diametrically opposite one another in a bore formed in said clamping screw transversely to the axis thereof, said ball members, in said locking position of said locking pin, being pressed against a shoulder of a bearing bore formed in the friction cylinder, said locking pin being slidable against the force of said spring in said blind bore in response to a force applicable through said key head received in said matching slot formed in said clamping pin so that an annular groove formed in said locking pin is radially aligned with said ball members whereby said ball members are freed from said shoulder of said bearing bore and drop into said annular groove.

5. Device for removably mounting a hollow friction cylinder in inking and moistening apparatus of a printing machine comprising clamping means including a clamping screw and a clamping nut threaded thereon extending into the friction cylinder, respectively, from opposite ends of the cylinder, and being mutually threadedly rotatable for varying the length of said clamping means, axially displaceable bearing pins for the friction cylinder having respective receiving shells wherein respective end portions of said screw and said nut are received, means for form locking the respective end portions in said receiving shells against relative displacement in axial direction thereof, and means for affording removal of the respective end portions from the receiving shells in radial direction of the respective end portions, each bearing pin having a flange substantially conforming to a guide bore formed in the friction cylinder, said clamping means being actuable externally to the friction cylinder to force said flanges into said respective guide bores.